US010809731B2

(12) United States Patent
Luo

(10) Patent No.: US 10,809,731 B2
(45) Date of Patent: Oct. 20, 2020

(54) SYSTEMS AND METHODS FOR TRAJECTORY DETERMINATION

(71) Applicant: BEIJING VOYAGER TECHNOLOGY CO., LTD., Beijing (CN)

(72) Inventor: Wei Luo, Beijing (CN)

(73) Assignee: BEIJING VOYAGER TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 16/236,313

(22) Filed: Dec. 28, 2018

(65) Prior Publication Data
US 2019/0155290 A1 May 23, 2019

Related U.S. Application Data

(63) Continuation of application No. PCT/CN2017/092714, filed on Jul. 13, 2017.

(51) Int. Cl.
G05D 1/02 (2020.01)
G01C 21/34 (2006.01)
B60W 30/00 (2006.01)
G05D 1/00 (2006.01)

(52) U.S. Cl.
CPC ........... G05D 1/0214 (2013.01); B60W 30/00 (2013.01); G01C 21/3407 (2013.01); G05D 1/0217 (2013.01); G05D 1/0274 (2013.01); G05D 1/0088 (2013.01); G05D 2201/0213 (2013.01)

(58) Field of Classification Search
CPC combination set(s) only.
See application file for complete search history.

(56) References Cited

U.S. PATENT DOCUMENTS

| 10,156,848 B1* | 12/2018 | Konrardy | G01C 21/3697 |
| 10,386,192 B1* | 8/2019 | Konrardy | G05D 1/0088 |
| 10,386,845 B1* | 8/2019 | Konrardy | G05D 1/0212 |
| 2009/0140887 A1* | 6/2009 | Breed | G01C 21/165 340/990 |
| 2016/0003636 A1* | 1/2016 | Ng-Thow-Hing | H04N 7/188 701/26 |

(Continued)

FOREIGN PATENT DOCUMENTS

| CN | 104636763 A | 5/2015 |
| CN | 105549597 A | 5/2016 |

(Continued)

OTHER PUBLICATIONS

International Search Report in PCT/CN2017/092714 dated Apr. 20, 2018, 5 pages.
Written Opinion in PCT/CN2017/092714 dated Apr. 20, 2018, 4 pages.
First Office Action in Canadian Application No. 3027627 dated Nov. 26, 2019, 5 pages.

(Continued)

Primary Examiner — Masud Ahmed
(74) Attorney, Agent, or Firm — Metis IP LLC

(57) ABSTRACT

Systems and methods for trajectory determination are provided. The systems perform the operations including obtaining status information of a vehicle; determining one or more original trajectories from a current location of the vehicle to a destination based on the status information of the vehicle; determining one or more candidate trajectories from the original trajectories; and determining a target trajectory from the candidate trajectories based on a trajectory evaluation model.

20 Claims, 11 Drawing Sheets

(56) References Cited

U.S. PATENT DOCUMENTS

| | | | |
|---|---|---|---|
| 2016/0129907 A1 | 5/2016 | Kim et al. | |
| 2016/0327959 A1 | 11/2016 | Brown et al. | |
| 2017/0060137 A1 | 3/2017 | Shitamoto | |
| 2017/0083021 A1 | 3/2017 | Balaghiasefi et al. | |
| 2017/0090480 A1* | 3/2017 | Ho | G05D 1/0214 |
| 2017/0123429 A1 | 5/2017 | Levinson et al. | |
| 2017/0168492 A1 | 6/2017 | Shitamoto | |
| 2017/0364083 A1 | 12/2017 | Yang et al. | |
| 2018/0063767 A1* | 3/2018 | Matos | H04W 40/026 |
| 2018/0231979 A1* | 8/2018 | Miller | G06Q 30/0242 |
| 2018/0276986 A1* | 9/2018 | Delp | G08G 1/005 |

FOREIGN PATENT DOCUMENTS

| | | |
|---|---|---|
| CN | 105675002 A | 6/2016 |
| CN | 106527452 A | 3/2017 |
| CN | 103942536 B | 4/2017 |
| CN | 106681335 A | 5/2017 |
| CN | 106774327 A | 5/2017 |
| CN | 106873600 A | 6/2017 |
| DE | 102013225057 A1 | 6/2015 |
| JP | 2007257274 A | 10/2007 |
| JP | 2011178043 A | 9/2011 |
| JP | 2014106561 A | 6/2014 |
| WO | 2017040929 A1 | 3/2017 |

OTHER PUBLICATIONS

Extended European Search Report in European Application No. 17912343.5 dated Oct. 8, 2019, 7 pages.

First Examination Report in Australian Application No. 2017418043 dated Oct. 1, 2019, 3 pages.

Ziegler J et al., Making Bertha Drive—An Autonomous Journey on a Historic Route, IEEE Intelligent Transportation Systems Magazine, 6(2): 8-20, 2014.

Ziegler J et al., Fast Collision Checking for Intelligent Vehicle Motion Planning, IEEE Intelligent Vehicles Symposium, 518-522, 2010.

Ziegler J et al., Trajectory Planning for Bertha—A Local, Continuous Method, IEEE Intelligent Vehicles Symposium, 450-457, 2014.

Werling M et al., Optimal Trajectory Generation for Dynamic Street Scenarios in a Frenet Frame, IEEE international Conference on Robotics and Automation, 987-993, 2010.

Houenou A et al., Risk Assessment for Collision Avoidance Systems, IEEE 17th International Conference on Intelligent Transportation Systems, 386-391, 2014.

Jain A et al., Brain4Cars: Car That Knows Before You Do via Sensory-Fusion Deep Learning Architecture, arXiv.org, 2016.

Notice of Reasons for Rufusal in Japanese Application No. 2018-565872 dated Apr. 21, 2020, 6 pages.

* cited by examiner

SYSTEMS AND METHODS FOR TRAJECTORY DETERMINATION

CROSS-REFERENCE TO RELATED APPLICATIONS

This application is a Continuation of International Application No. PCT/CN2017/092714, filed on Jul. 13, 2017, the entire contents of which are hereby incorporated by reference.

TECHNICAL FIELD

This present disclosure generally relates to systems and methods for trajectory determination, and more particularly, to systems and methods for trajectory determination for an unmanned vehicle.

BACKGROUND

With the development of cutting-edge technologies such as artificial intelligence (AI), an unmanned vehicle has great prospects for multiple applications, for example, the transportation service. Without human maneuvering, it is challenging for the unmanned vehicle to arrive at a destination safely. Therefore, it is important to determine an optimal trajectory for the unmanned vehicle to follow such that the unmanned vehicle reaches the destination safely.

SUMMARY

According to an aspect of the present disclosure, a system is provided. The system may include at least one storage medium and at least one processor configured to communicate with the at least one storage medium. The at least one storage medium may include a set of instructions. When the at least one storage medium executes the set of instructions, the at least one processor may be directed to perform one or more of the following operations. The at least one processor may obtain status information of a vehicle. The at least one processor may determine one or more original trajectories from a current location of the vehicle to a destination based on the status information of the vehicle. The at least one processor may determine one or more candidate trajectories from the one or more original trajectories. The at least one processor may determine a target trajectory from the one or more candidate trajectories based on a trajectory evaluation model.

In some embodiments, the status information of the vehicle may include a driving direction of the vehicle, an instantaneous speed of the vehicle, an instantaneous accelerated speed of the vehicle, a wheel base of the vehicle, a front wheel steering angle of the vehicle, or the like, or any combination thereof.

In some embodiments, the at least one processor may determine one or more sub-target locations related to the destination. The at least one processor may further determine the one or more original trajectories based on the status information of the vehicle and the one or more sub-target locations.

In some embodiments, the at least one processor may determine one or more obstacles in a grid map. The at least one processor may further perform a collision detection between the one or more original trajectories and the one or more obstacles. The at least one processor may further determine the one or more candidate trajectories from the one or more original trajectories based on the collision detection.

In some embodiments, the at least one processor may extract one or more features with respect to the one or more candidate trajectories. The at least one processor may further evaluate the one or more candidate trajectories based on the one or more features and the trajectory evaluation model. The at least one processor may further determine the target trajectory based on the trajectory evaluation model.

In some embodiments, the at least one processor may obtain a plurality of sample trajectories. The at least one processor may determine training data based on the plurality of sample trajectories. The at least one processor may further determine the trajectory evaluation model based on the training data.

In some embodiments, the at least one processor may extract one or more sample features with respect to the plurality of sample trajectories and a sample evaluation result associated with each of the plurality of sample trajectories. The at least one processor may further determine the one or more sample features and the corresponding sample evaluation results as the training data.

In some embodiments, the one or more sample features may include a sample starting location, a sample destination, a sample speed of a vehicle, a sample accelerated speed of a vehicle, a sample curvature of a sample trajectory, or the like, or any combination thereof.

In some embodiments, the at least one processor may determine a speed planning strategy based on the target trajectory.

According to another aspect of the present disclosure, a method is provided. The method may include obtaining status information of a vehicle. The method may include determining one or more original trajectories from a current location of the vehicle to a destination based on the status information of the vehicle. The method may further include determining one or more candidate trajectories from the one or more original trajectories. The method may further include determining a target trajectory from the one or more candidate trajectories based on a trajectory evaluation model.

According to another aspect of the present disclosure, a system is provided. The system may include a status information obtaining module configured to obtain status information of a vehicle, a trajectory generation module configured to determine one or more original trajectories from a current location of the vehicle to a destination based on the status information of the vehicle, a candidate trajectory determination module configured to determine one or more candidate trajectories from the one or more original trajectories, a target trajectory determination module configured to determine a target trajectory from the one or more candidate trajectories based on a trajectory evaluation model.

According to another aspect of the present disclosure, a non-transitory computer readable medium is provided. The non-transitory computer readable medium may comprise at least one set of instructions for determining a trajectory for a vehicle. When executed by at least one processor of an electronic terminal, the at least one instruction may directs the at least one processor to perform acts of: obtaining status information of a vehicle; determining one or more original trajectories from a current location of the vehicle to a destination based on the status information of the vehicle; determining one or more candidate trajectories from the one or more original trajectories; and determining a target trajectory from the one or more candidate trajectories based on a trajectory evaluation model.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
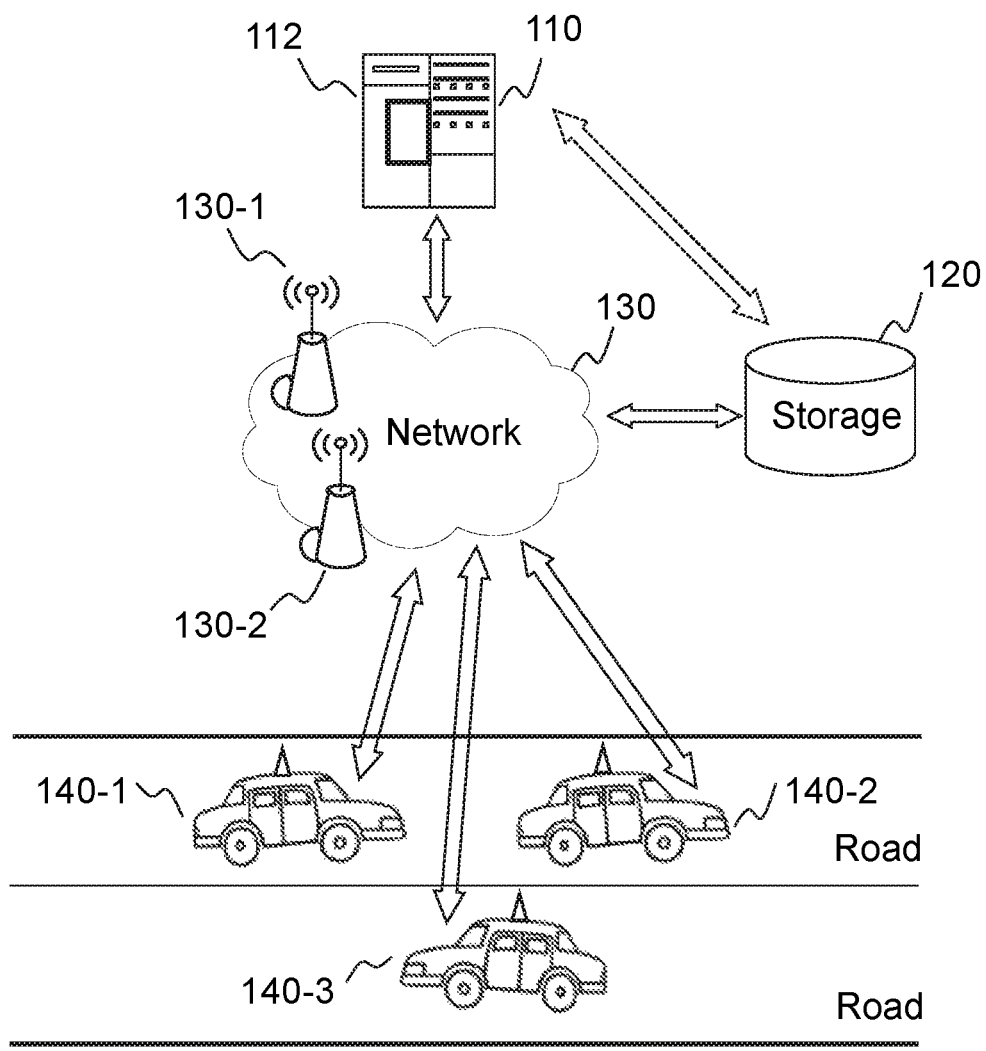
FIG. 1 is a block diagram of an exemplary unmanned vehicle assistance system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

Moreover, while the systems and methods disclosed in the present disclosure are described primarily regarding determining a trajectory of a vehicle (e.g., an unmanned vehicle), it should be understood that this is only one exemplary embodiment. The system or method of the present disclosure may be applied to any other kind of navigation system. For example, the system or method of the present disclosure may be applied to transportation systems of different environments including land, ocean, aerospace, or the like, or any combination thereof. The unmanned vehicle of the transportation systems may include a taxi, a private car, a hitch, a bus, a train, a bullet train, a high-speed rail, a subway, a vessel, an aircraft, a spaceship, a hot-air balloon, a driverless vehicle, or the like, or any combination thereof. In some embodiments, the system or method may find applications in, e.g., logistic warehousing, military affairs.

An aspect of the present disclosure relates to systems and methods for determining a trajectory for a vehicle. To this end, the system may obtain vehicle status information of the vehicle. The system may then determine one or more original trajectories from a current location of the vehicle to the destination based on the vehicle status information. In some embodiments, the system may generate the one or more original trajectories from the current location to the destination by using a polynomial curve generation algorithm. The system may then perform a collision detection on the one or more original trajectory to determine whether some trajectories do not collide with an obstacle. The system may further select one optimal trajectory from the trajectories that does not collide with an obstacle. In some embodiments, the trajectory evaluation model may be determined based on a machine learning technique (e.g., an artificial neural network, support vector machine (SVM), decision tree, random forest).

FIG. 1 is a block diagram of an exemplary unmanned vehicle assistance system 100 according to some embodiments of the present disclosure. For example, the unmanned vehicle assistance system 100 may be an online platform including a server 110, a storage 120, a network 130, a plurality of unmanned vehicles 140-1,140-2,140-3, etc. The server 110 may include a processing engine 112.

In some embodiments, the server 110 may be a single server, or a server group. The server group may be centralized, or distributed (e.g., the server 110 may be a distributed system). In some embodiments, the server 110 may be local or remote. For example, the server 110 may access information and/or data stored in the unmanned vehicles 140-1, 140-2,140-3, and/or the storage 120 via the network 130. As another example, the server 110 may be directly connected to the unmanned vehicles 140-1, 140-2, 140-3, . . . , and/or the storage 120 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to trajectory determination to perform one or more functions described in the present disclosure. For example, the processing engine 112 may collect information of status information of a vehicle and/or environment information around the vehicle, and determine a target trajectory for the vehicle. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The storage 120 may store data and/or instructions. In some embodiments, the storage 120 may store data obtained from the unmanned vehicles 140-1,140-2,140-3. In some embodiments, the storage 120 may store data and/or instructions that the server 110 may execute or use to perform exemplary methods described in the present disclosure. In some embodiments, the storage 120 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 120 may be connected to the network 130 to communicate with one or more components of the unmanned vehicle assistance system 100 (e.g., the server 110, the unmanned vehicles 140-1,140-2, 140-3). One or more components in the unmanned vehicle assistance system 100 may access the data or instructions stored in the storage 120 via the network 130. In some embodiments, the storage 120 may be directly connected to or communicate with one or more components in the unmanned vehicle assistance system 100 (e.g., the server 110, the unmanned vehicles 140-1,140-2,140-3). In some embodiments, the storage 120 may be part of the server 110.

The network 130 may facilitate exchange of information and/or data. In some embodiments, one or more components in the unmanned vehicle assistance system 100 (e.g., the server 110, the storage 120, and the unmanned vehicles 140-1,140-2,140-3) may send information and/or data to other component(s) in the unmanned vehicle assistance system 100 via the network 130. For example, the server 110 may obtain/acquire vehicle status information of the vehicle and/or environment information around the vehicle via the network 130. In some embodiments, the network 130 may be any type of wired or wireless network, or combination thereof. Merely by way of example, the network 130 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 130 may include one or more network access points. For example, the network 120 may include wired or wireless network access points such as base stations and/or internet exchange points 130-1, 130-2, . . . , through which one or more components of the unmanned vehicle assistance system 100 may be connected to the network 130 to exchange data and/or information.

In some embodiments, the unmanned vehicles 140-1,140-2,140-3 may include structures of a conventional vehicle. The structure of a conventional vehicle may include a chassis, a suspension, steering, a braking, drivetrain components, or an engine. The unmanned vehicle may also include a plurality of sensors to provide information that is used to control the unmanned vehicle. In some embodiments, the sensors may sense information with respect to vehicle status information of the unmanned vehicle. The sensor may include a distance sensor, a speed sensor, an acceleration sensor, a steering angle sensor, a traction-related sensor, and/or any sensor configured to sense information relating to dynamic situation of the unmanned vehicle.

For example, the distance sensor (e.g., a radar, a lidar, an infrared sensor) may determine a distance between a vehicle (e.g., 140-1) and other vehicle (e.g., 140-2, 140-3). The distance sensor may also determine a distance between a vehicle (e.g., 140-1,140-2,140-3) and one or more obstacles (e.g., static obstacles, dynamic obstacles). The speed sensor (e.g., a Hall sensor) may determine a speed (e.g., an instantaneous speed, an average speed) of the unmanned vehicle (e.g., 140-1,140-2,140-3). The acceleration sensor (e.g., an accelerometer) may determine an accelerated speed (e.g., an instantaneous accelerated speed, an average accelerated speed) of the unmanned vehicle (e.g., 140-1,140-2,140-3). The steering angle sensor (e.g., a tilt sensor) may determine a steering angle of the unmanned vehicle (e.g., 140-1,140-2,140-3). The traction-related sensor (e.g., a force sensor) may determine a traction of the unmanned vehicle (e.g., 140-1,140-2,140-3).

In some embodiments, the sensors may sense environment information around the vehicle. For example, one or more sensors may detect a road geometry and obstacles (e.g., static obstacles, dynamic obstacles). The road geometry may include a road width, road length, road type (e.g., ring road, straight road, one-way road, two-way road). The static obstacles may include a building, tree, roadblock, or the like, or any combination thereof. The dynamic obstacles may include moving vehicles, pedestrians, and/or animals, or the like, or any combination thereof. The one or more sensors may be or include one or more video cameras, laser-sensing systems, infrared-sensing systems, acoustic-sensing systems, thermal-sensing systems, or the like, or any combination thereof.

In some embodiments, the vehicle may also include a positioning system. In some embodiments, the positioning system may be implemented on the unmanned vehicle. The positioning system may provide navigation information related to the unmanned vehicle. The navigation information may include a current location of the unmanned vehicle, a destination of the unmanned vehicle, a velocity, an acceleration, a current time, or the like, or any combination thereof. The location may be in the form of coordinates, such as a latitude coordinate and a longitude coordinate. The positioning system may include a compass navigation system (COMPASS), a global positioning system (GPS), a BeiDou navigation satellite system, a Galileo positioning system, a quasi-zenith satellite system (QZSS), etc.

In some embodiments, one or more components of the unmanned vehicle assistance system 100 (e.g., the server 110) may access the storage 120. In some embodiments, one or more components of the unmanned vehicle assistance system 100 may read and/or modify information relating to one or more settings of the unmanned vehicle. The settings may include a speed setting, navigation setting, music setting, seat adjustment setting, rainy driving mode setting, snowy driving mode setting, foggy driving mode setting, or the like, or any combination thereof.

Figure 2:
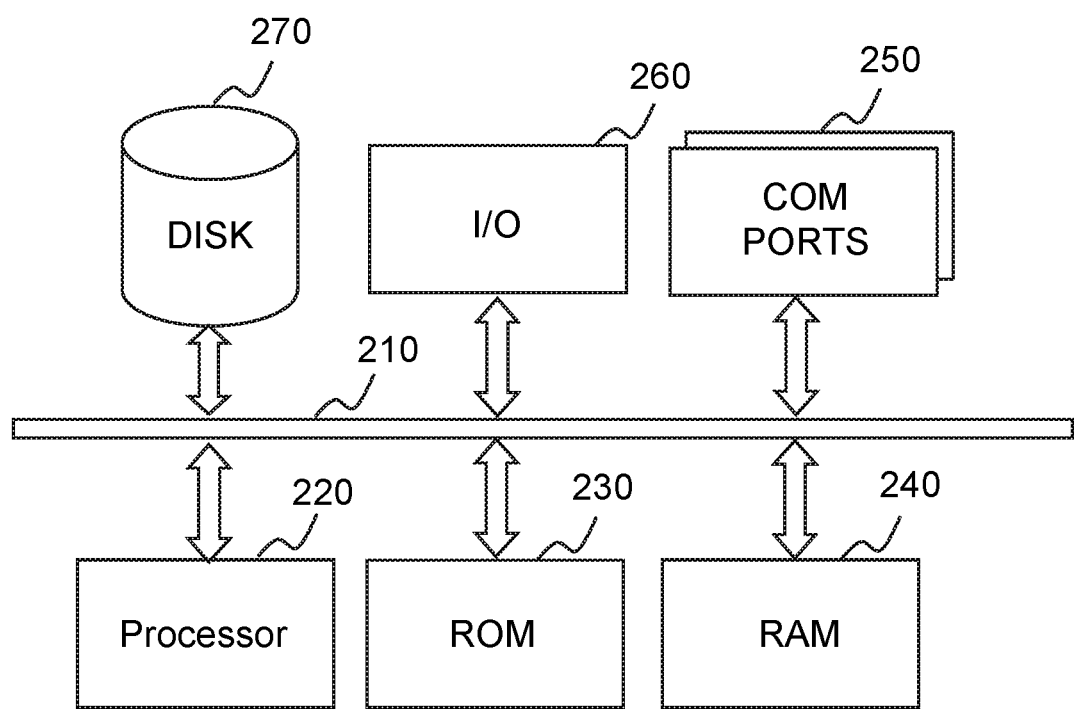
FIG. 2 is a schematic diagram illustrating exemplary hardware and software components of a computing device according to some embodiments of the present disclosure.

FIG. 2 is a schematic diagram illustrating exemplary hardware and software components of a computing device 200 on which the server 110, the unmanned vehicles 140-1, 140-2, 140-3, . . . , may be implemented according to some embodiments of the present disclosure. For example, the processing engine 112 may be implemented on the computing device 200 and configured to perform functions of the processing engine 112 disclosed in this disclosure.

The computing device 200 may be a general purpose computer or a special purpose computer, both may be used to implement an on-demand system for the present disclosure. The computing device 200 may be used to implement any component of the on-demand service as described herein. For example, the processing engine 112 may be implemented on the computing device 200, via its hardware, software program, firmware, or a combination thereof. Although only one such computer is shown, for convenience, the computer functions relating to the on-demand service as described herein may be implemented in a distributed fashion on a number of similar platforms, to distribute the processing load.

The computing device 200, for example, may include COM ports 250 connected to and from a network connected thereto to facilitate data communications. The computing device 200 may also include a processor 220, in the form of one or more processors, for executing computer instructions. The computer instructions may include, for example, routines, programs, objects, components, data structures, procedures, modules, and functions, which perform particular functions described herein. For example, the processor 220 may obtain one or more sample features related to a plurality of sample trajectories. The sample trajectories may include historical trajectories within a predetermined time period. The one or more sample features related to a sample trajectory may include a sample starting location, a sample destination a sample speed of a vehicle associated with the sample trajectory, a sample accelerated speed of the vehicle, a sample instantaneous curvature of the sample trajectory, or the like, or any combination thereof.

In some embodiments, the processor 220 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

The exemplary computer device 200 may include an internal communication bus 210, program storage and data storage of different forms, for example, a disk 270, and a read only memory (ROM) 230, or a random access memory (RAM) 240, for various data files to be processed and/or transmitted by the computer. The exemplary computer device 200 may also include program instructions stored in the ROM 230, RAM 240, and/or other type of non-transitory storage medium to be executed by the processor 220. The methods and/or processes of the present disclosure may be implemented as the program instructions. The computing device 200 also includes an I/O component 260, supporting input/output between the computer and other components (e.g., user interface elements). The computing device 200 may also receive programming and data via network communications.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor 220 of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

Figure 3:
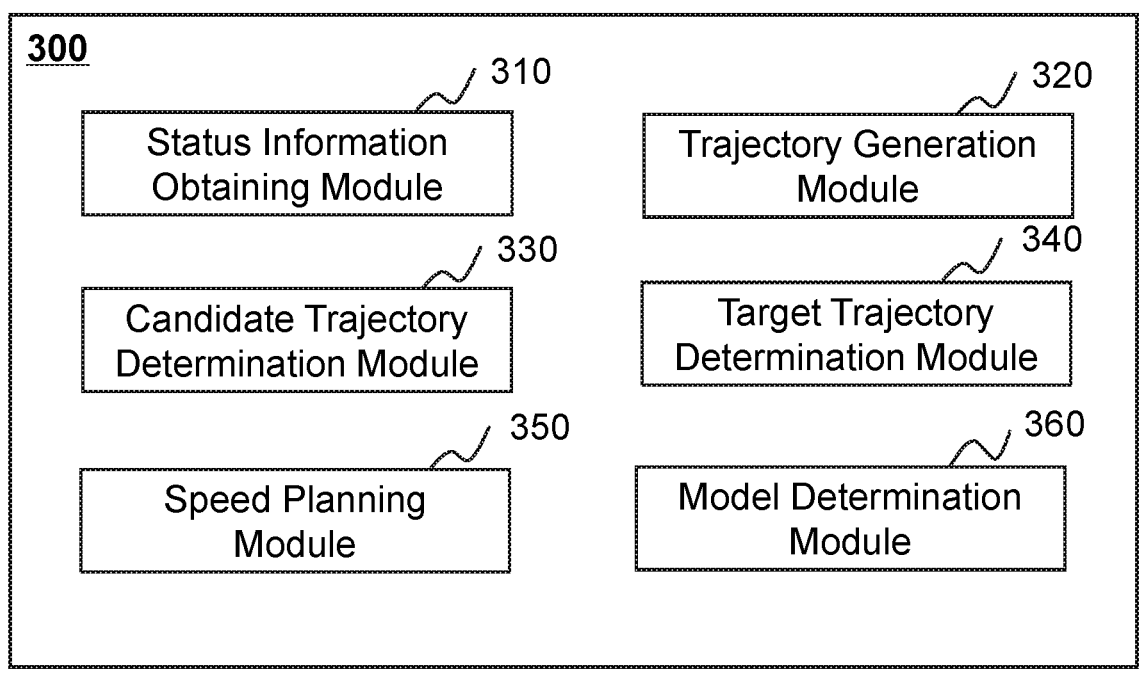
FIG. 3 is a block diagram illustrating an exemplary processor according to some embodiments of the present disclosure.

FIG. 3 is a block diagram illustrating an exemplary processor 300 according to some embodiments of the present disclosure. The processor 300 may include a status information obtaining module 310, a trajectory generation module 320, a candidate trajectory determination module 330, a target trajectory determination module 340, a speed planning module 350, and a model determination module 360. Each module may be a hardware circuit that is designed to perform the following actions, a set of instructions stored in one or more storage media, and/or a combination of the hardware circuits and the one or more storage media.

The status information obtaining module 310 may be configured to obtain vehicle status information of a vehicle (also referred to herein as vehicle status information). In some embodiments, the vehicle may be any types of unmanned vehicle (e.g., 140-1,140-2,140-3). The unmanned vehicle may be capable of sensing its environment and navigating without human maneuvering. In some embodiments, the status information obtaining module 310 may to obtain the vehicle status information from one or more sensors. The one or more sensors may include a distance sensor, a speed sensor, an acceleration sensor, a steering angle sensor, a traction-related sensor, a braking-related sensor, and/or any sensor configured to sense information relating to dynamic situation of the vehicle. In some embodiments, the status information obtaining module 310 may send the obtained vehicle status information to other modules for further processing (e.g., the trajectory generation module 320, the model determination module 360).

In some embodiments, the vehicle status information may include a driving direction of the vehicle, an instantaneous speed of the vehicle, an instantaneous accelerated speed of the vehicle, a wheel base length of the vehicle, a front wheel steering angle of the vehicle, etc.

The trajectory generation module 320 may be configured to determine one or more original trajectories. The determined original trajectories may be stored in any storage medium (e.g., the storage 120) in the unmanned vehicle assistance system 100. In some embodiments, the trajectory generation module 320 may determine the one or more original trajectories from a current location of the vehicle to a destination based on the vehicle status information. The trajectory generation module 320 may obtain the vehicle status information from a storage medium (e.g., the storage 120), or obtain the vehicle status information from the status information obtaining module 310. In some embodiments, the trajectory generation module 320 may generate the one or more original trajectories from the current location to the destination by using a polynomial curve generation algorithm. In some embodiments, the trajectory generation module 320 may further determine the one or more original trajectories based on a vehicle dynamics model. The vehicle dynamics model may be determined based on the vehicle status information.

In some embodiments, the trajectory generation module 320 may obtain environment information around the vehicle. For example, the environment information may include a road edge, a lane, an available lane, a road type, a road surface status, a traffic condition, a weather condition, obstacle information, or the like, or any combination thereof. In some embodiments, the trajectory generation module 320 may determine the one or more original trajectories based on the vehicle status information. In some embodiments, the trajectory generation module 320 may determine the one or more original trajectories based on both the vehicle status information and the environment information around the vehicle.

The candidate trajectory determination module 330 may be configured to determine one or more candidate trajectories from the one or more original trajectories. The candidate trajectories may be stored in any storage medium (e.g., the storage 120) in the unmanned vehicle assistance system 100. In some embodiments, the candidate trajectory determination module 330 may determine the candidate trajectories by detecting whether the vehicle collides with one or more obstacles when moving along the one or more original trajectories. For example, assuming that one or more obstacles exist in front of the vehicle, the candidate trajectory determination module 330 may determine whether the vehicle collides with any of the one or more obstacles when moving along a first trajectory. If the candidate trajectory determination module 330 determines that the vehicle may collide with any of the one or more obstacles, the candidate trajectory determination module 330 may not determine the first trajectory as a candidate trajectory. In some embodiments, the candidate trajectory determination module 330 may determine whether the vehicle may collide with the one or more obstacles based on a grid method.

The target trajectory determination module 340 may be configured to determine a target trajectory from the candidate trajectories. The target trajectory determination module 340 may obtain the candidate trajectories from a storage medium (e.g., the storage 120), or directly obtain from the candidate trajectory determination module 330. In some embodiments, the target trajectory module 340 may determine the target trajectory from the candidate trajectories based on a trajectory evaluation model. The target trajectory module 340 may obtain the trajectory evaluation model from the model determination module 360. In some embodiments, the trajectory evaluation model may be determined based on a machine learning technique. The machine learning technique may include an artificial neural network, support vector machine (SVM), decision tree, random forest, or the like, or any combination thereof. In some embodiments, the trajectory evaluation model may include a weighting function. The target trajectory determination module 340 may further determine the target trajectory based on values of the weighting functions corresponding to the plurality of candidate trajectories.

The speed planning module 350 may be configured to determine a speed planning strategy relating to the target trajectory. The speed planning module 350 may output one or more instructions and/or operations to control the movement of the vehicle based on the determined speed planning strategy. The speeding planning strategy may include timing information relating to each of the positions on the target trajectory, a speed relating to each of the positions of the target trajectory, an accelerated speed relating to each of the positions of the target trajectory, a wheel steel angle relating to each of the positions of the target trajectory, etc. For example, when the vehicle needs to change lanes, the speed planning module 350 may instruct the vehicle to execute speeding up and/or slowing down strategy based on a distance (e.g., a lateral distance, a longitudinal distance) between the vehicle and the front vehicle. As another example, when moving on a curved road, the speed planning module 350 may instruct the vehicle to move at a slower speed relative to a condition when the vehicle moves on a straight road.

The model determination module 360 may be configured to determine a trajectory evaluation model. In some embodiments, the model determination module 360 may obtain a plurality of sample trajectories from a storage medium (e.g., the storage 120). The plurality of sample trajectories may include historical trajectories within a predetermined time period. The model determination module 360 may extract one or more sample features with respect to each of the plurality of sample trajectories. The one or more sample features may include a sample starting location, a sample destination, a sample speed of a vehicle, a sample accelerated speed of a vehicle, a sample curvature of a sample trajectory, or the like, or any combination thereof. In some embodiments, the model determination module 360 may train the trajectory evaluation model based on the one or more features. In some embodiments, the trajectory evaluation model may be determined based on a machine learning technique (e.g., an artificial neural network, decision tree, random forest). In some embodiments, the trajectory evaluation model may be a weighting function.

The modules in the processor 300 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Any two of the modules may be combined as a single module, any one of the modules may be divided into two or more units.

Figure 4:
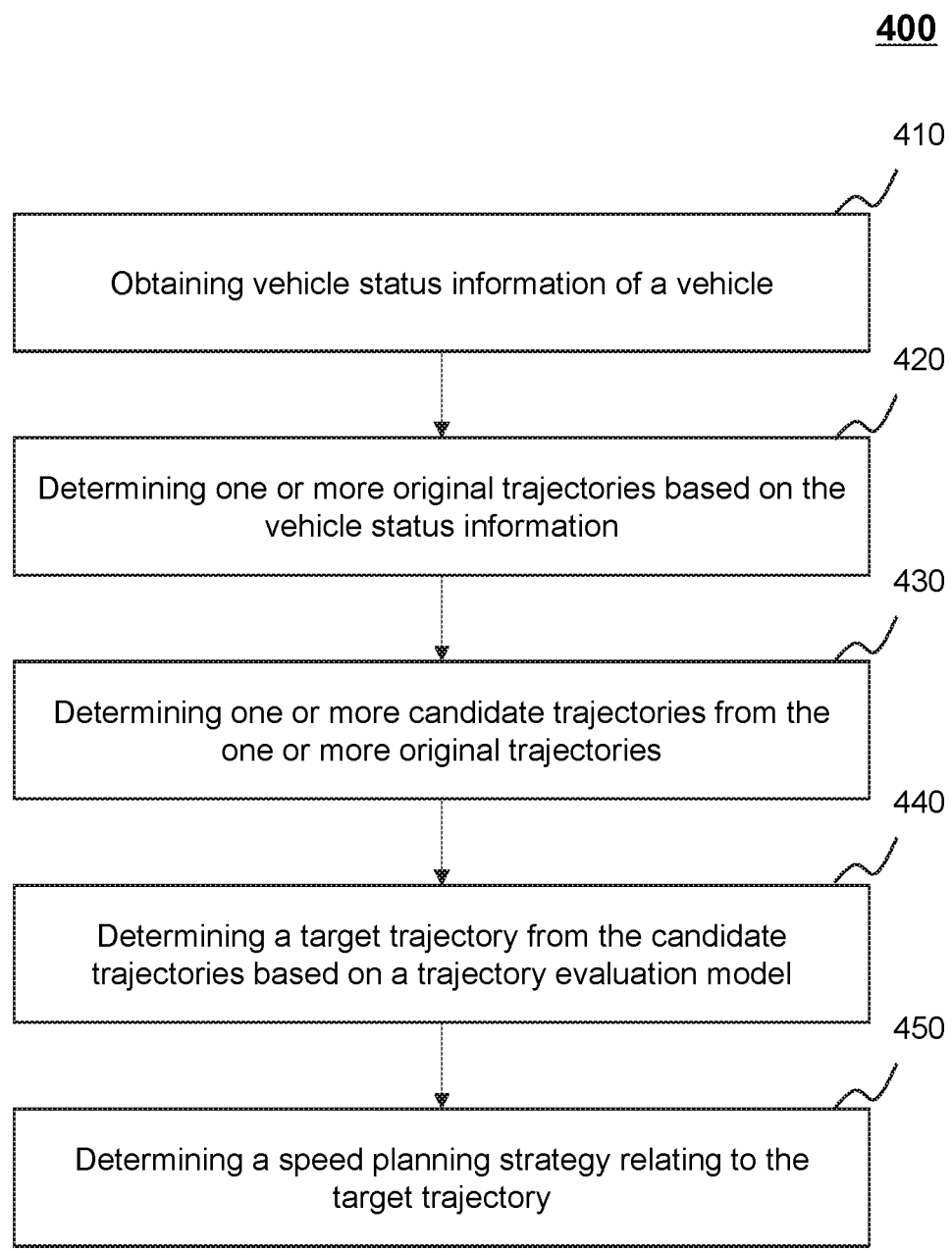
FIG. 4 is a flowchart illustrating an exemplary process and/or method for determining a target trajectory according to some embodiments of the present disclosure.

FIG. 4 is flowchart illustrating an exemplary process and/or method for determining a target trajectory according to some embodiments of the present disclosure. The process and/or method 400 may be executed by a processor in an unmanned vehicle assistance system 100 (e.g., the server 110). For example, the process and/or method 400 may be implemented as a set of instructions (e.g., an application) stored in a non-transitory computer readable storage medium (e.g., the storage 120). The processor may execute the set of instructions and may accordingly be directed to perform the process and/or method 400 via receiving and/or sending electronic signals.

In 410, the processor 300 (e.g., the status information obtaining module 310) may obtain status information of a vehicle (also referred to herein as vehicle status information). In some embodiments, the vehicle may be any type of unmanned vehicle. The unmanned vehicle may be capable of sensing its environment and navigating without human maneuvering. The unmanned vehicle may include one or more sensors (e.g., a radar, a lidar) to sense information about the vehicle status information and/or the environment around the vehicle. In some embodiments, the vehicle status information may include a driving direction of the vehicle, a speed (e.g., an instantaneous speed, an average speed) of the vehicle, an accelerated speed (e.g., an instantaneous accelerated speed, an average accelerated speed) of the vehicle, a wheel base of the vehicle, a wheel steering angle (e.g., a steering angle of a front wheel) of the vehicle, or the like, or any combination thereof.

In 420, the processor 300 (e.g., the trajectory generation module 320) may determine one or more original trajectories from a current location of the vehicle to a destination based on the vehicle status information. The current location of the vehicle may be obtained by using a positioning system (e.g., GPS). In some embodiments, the destination may be a position in a centerline of a road or a lane. In some embodiments, the destination may be an area covering the centerline of a road or a lane.

In some embodiments, the processor 300 may generate the one or more original trajectories from the current location to the destination by using a polynomial curve generation algorithm. The polynomial curve generation algorithm may include a cubic spline curve generation algorithm, quintic polynomial curve generation algorithm, Euler spiral generation algorithm, Bzier curve generation algorithm, or the like, or any combination thereof. In some embodiments, the trajectory generation module 320 may further determine the one or more original trajectories based on a vehicle dynamics model. The vehicle dynamics model may be determined based on the vehicle status information. Detailed description of determining the one or more original trajectories may be found elsewhere in the present disclosure. See, e.g., FIGS. 5A-5D and the description thereof.

In 430, the processor 300 (e.g., the candidate trajectory determination module 330) may determine one or more candidate trajectories from the one or more original trajectories. In some embodiments, the processor 300 (e.g., the candidate trajectory determination module 330) may determine whether the vehicle collides with one or more obstacles when moving along the one or more original trajectories. For example, assuming that one or more obstacles exist around or along the path that the vehicle drives through, the processor 300 (e.g., the candidate trajectory determination module 330) may determine whether the vehicle collides with any of the one or more obstacles when moving along a first trajectory of the one or more trajectories. If the vehicle may not collide with the any of the one or more obstacles, the processor 300 (e.g., the candidate trajectory determination module 330) may determine the first trajectory as a candidate trajectory. If the processor 300 (e.g., the candidate trajectory determination module 330) determines that the vehicle may collide with any of the one or more obstacles while moving along the first trajectory, the processor 300 (e.g., the candidate trajectory determination module 330) may not determine the first trajectory as a candidate trajectory. In some embodiments, the processor 300 (e.g., the candidate trajectory determination module 330) may determine whether the vehicle collides with the one or more obstacles based on a grid map. In some embodiments, the candidate trajectories may be determined by performing one or more operations described in connection with FIG. 6B.

In 440, the processor 300 (e.g., the target trajectory determination module 340) may determine a target trajectory from the candidate trajectories based on a trajectory evaluation model. In some embodiments, the trajectory evaluation model may be determined based on a machine learning technique. The machine learning technique may include an artificial neural network, support vector machine (SVM), decision tree, random forest, or the like, or any combination thereof. Based on the trajectory evaluation model, the target trajectory determination module 340 may determine an optimal trajectory for the vehicle to follow. In some embodiments, the trajectory evaluation model may be determined by performing one or more operations described in connection with FIG. 7B.

In some embodiments, the process and/or method may further include speed planning for the target trajectory. In 450, the processor 300 (e.g., the speed planning module 350) may determine a speed planning strategy relating to the target trajectory. The speeding planning strategy may include timing information relating to each of the positions on the target trajectory, a speed relating to each of the positions of the target trajectory, an accelerated speed relating to each of the positions of the target trajectory, a wheel steel angle relating to each of the positions of the target trajectory, etc. For example, when the vehicle needs to change lanes, the processor may instruct the vehicle to execute speeding up and/or slowing down strategy based on a distance (e.g., a lateral distance, a longitudinal distance) between the vehicle and a vehicle ahead. When the distance is greater than a safe distance, the vehicle may maintain the speed or speed up at an accelerated speed to change lanes. When the distance is smaller than the safe distance, the vehicle may maintain the speed or slow down until it is safe to change lanes, i.e., until the distance between the vehicle and the vehicle ahead is greater than the safe distance. In some embodiments, the safe distance may be determined in real-time based on the current speed of the vehicle. In some embodiments, the safe distance may be a default value that is preset in the vehicle.

In some embodiments, the processor 300 (e.g., the speed planning module 350) may determine the speed planning strategy based on road information (e.g., crossing, speed limits, road type, etc.). For example, when moving on a curved road, the processor 300 (e.g., the speed planning module 350) may instruct the vehicle to move at a slower speed relative to a condition when the vehicle moves on a straight road. As another example, when moving through a tunnel, the processor may instruct the vehicle to move at a slower speed relative to a condition when the vehicle moves on an outdoor road. In some embodiments, the processor 300 (e.g., the speed planning module 350) may determine the speed planning strategy based on live traffic information, such as congestion condition in the city area. In some embodiments, the processor 300 (e.g., the speed planning module 350) may determine the speed planning strategy based on weather information that contributes to the congestion condition in the city. For example, the processor 300 (e.g., the speed planning module 350) may instruct the vehicle to move at a slower speed in a rainy day relative to in a sunny day. In some embodiments, the processor 300 (e.g., the speed planning module 350) may determine that the accelerated speed at each of the positions of the target trajectory may not exceed a first accelerated speed threshold to make a passenger in the vehicle comfortable. It should be understood for persons having ordinary skills in the art that the speed planning strategy may vary. All such variation are within the protection scope of the present disclosure.

Figure 5A:
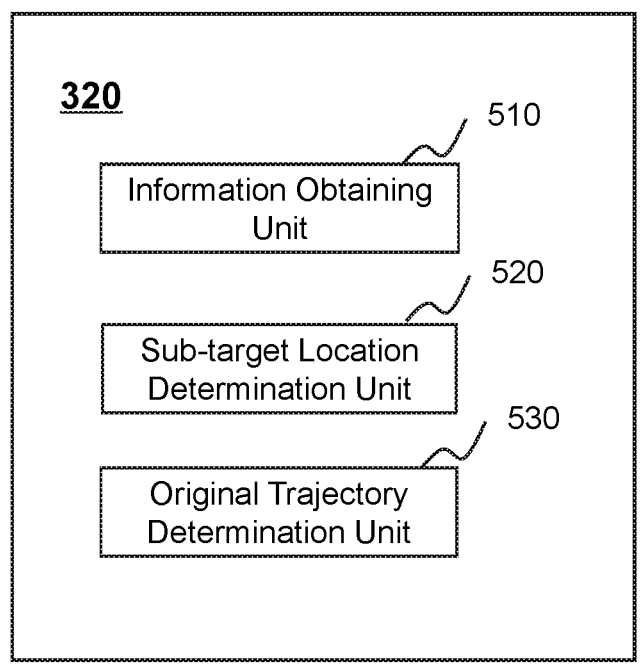
FIG. 5A is a block diagram illustrating an exemplary trajectory generation module according to some embodiments of the present disclosure.

FIG. 5A is a block diagram illustrating an exemplary trajectory generation module 320 according to some embodiments of the present disclosure. The trajectory generation module 320 may include an information obtaining unit 510, an sub-target location determination unit 520, and an original trajectory determination unit 530.

The information obtaining unit 510 may obtain vehicle status information of a vehicle. In some embodiments, the information obtaining unit 510 may obtain the vehicle status information from a storage medium (e.g., the storage 120, or any storage medium in the status information obtaining module 310 (not shown)) in the unmanned vehicle assistance system 100.

In some embodiments, the information obtaining unit 510 may also obtain environment information around the vehicle. In some embodiments, the information obtaining unit 510 may obtain the environment information around the vehicle from one or more sensors. The one or more sensors may be configured to obtain a plurality of images and/or data of the environment information around the vehicle and include one or more video cameras, laser-sensing devices, infrared-sensing devices, acoustic-sensing devices, thermal-sensing devices, or the like, or any combination thereof.

In some embodiments, the environment information around the vehicle may include a road edge, a lane, an available lane, a road type, a road surface status, a traffic condition, a weather condition, obstacle information, or the like, or any combination thereof. The obstacle information may include locations of one or more obstacles, sizes of the one or more obstacles, types of the one or more obstacles, motion status of the one or more obstacles, moving speeds of the one or more obstacles, or the like, or any combination thereof.

The sub-target location determination unit 520 may determine one or more sub-target locations related to a destination. The sub-target location determination unit 520 may determine the one or more sub-target locations in any suitable manner. For example, the one or more sub-target locations may be determined based on the current speed of the vehicle. As another example, as shown in FIG. 5C, assuming that point A may denote the current location of the vehicle, point B5 may denote the destination relating to the vehicle. The sub-target locations (e.g., B1, B2, B3, B4) may be determined as equal distance to each other between the current location A and the destination B5 along a road center line. In some embodiments, the sub-target locations may be determined by sample-based methods. In some embodiments, the one or more sub-target locations may be randomly sampled in a target area. The target area may be an area that covers the destination, e.g., a rectangular area B covering the destination B5 as shown in FIG. 5C. In some embodiments, the number of the sub-target locations may be a default value of the unmanned vehicle assistance system 100. In some embodiments, the number of the sub-target locations may be adjustable under different situations, e.g., the status information of the vehicle, the environment information around the vehicle or the destination.

The original trajectory determination unit 530 may determine one or more original trajectories. Furthermore, the original trajectory determination unit 530 may determine the one or more original trajectories based on the vehicle status information and/or the environment information. In some embodiments, the original trajectory determination unit 530 may generate the one or more original trajectories from the current location of the vehicle to the one or more sub-target locations and the destination. In some embodiments, the original trajectory determination unit may use a polynomial curve generation algorithm to generate the one or more original trajectories. The polynomial curve generation algorithm may include a cubic spline curve generation algorithm, quintic polynomial generation algorithm, Euler spiral generation algorithm, Bzier curve generation algorithm, or the like, or any combination thereof.

Figure 5B:
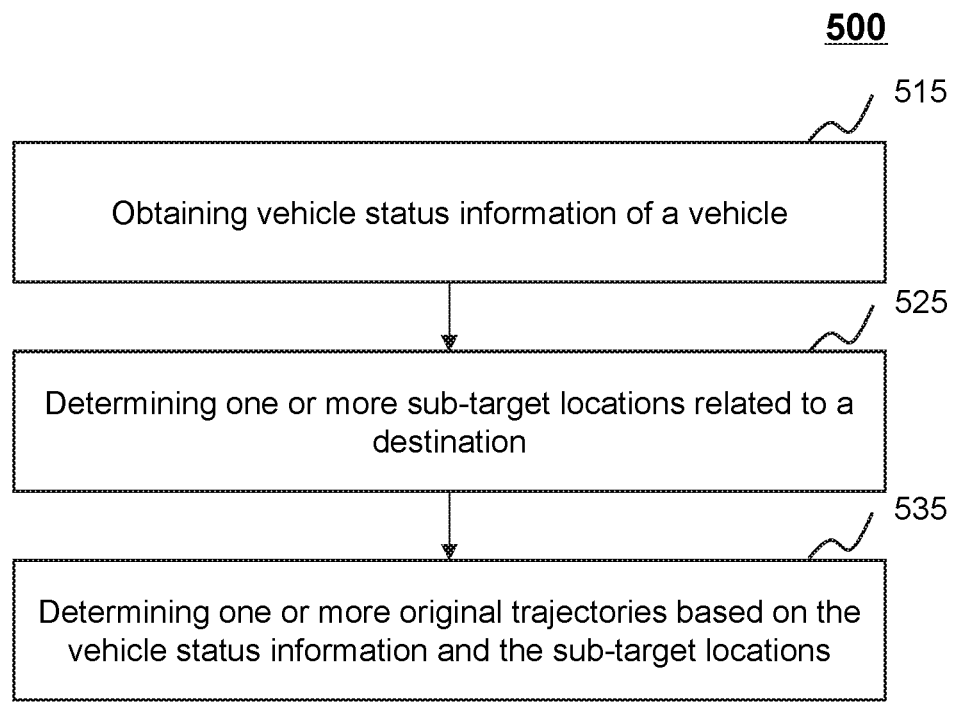
FIG. 5B is a flowchart illustrating an exemplary process and/or method for determining one or more original trajectories according to some embodiments of the present disclosure.
Figure 5C:
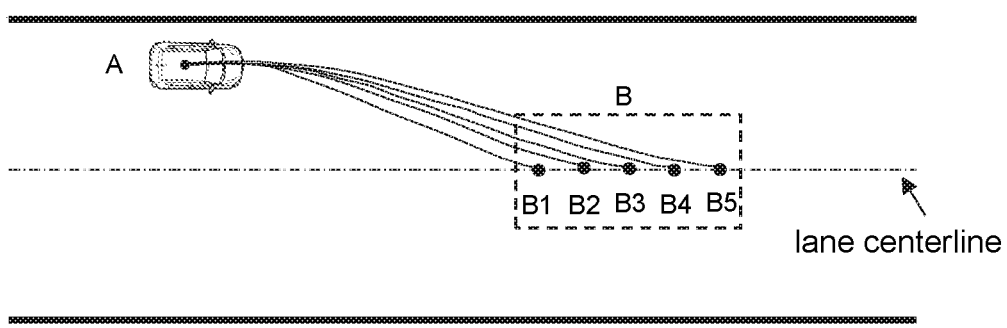
FIG. 5C is a schematic diagram illustrating a plurality of exemplary trajectories according to some embodiments of the present disclosure.

FIG. 5B is a flowchart illustrating an exemplary process and/or method for determining one or more original trajectories according to some embodiments of the present disclosure. The process and/or method 500 may be executed by a processor in the unmanned vehicle assistance system 100 (e.g., the server 110). For example, the process and/or method 500 may be implemented as a set of instructions (e.g., an application) stored in a non-transitory computer readable storage medium (e.g., the storage 120). The processor may execute the set of instructions and may accordingly be directed to perform the process and/or method 500 via receiving and/or sending electronic signals.

In 515, the processor 300 (e.g., the information obtaining unit 510 in the trajectory generation module 320) may obtain vehicle status information of a vehicle. In some embodiments, the processor 300 may to obtain the vehicle status information from one or more sensors. The one or more sensors may include a distance sensor, a speed sensor, an acceleration sensor, a steering angle sensor, a traction-related sensor, a braking-related sensor, and/or any sensor configured to sense information relating to dynamic situation of the vehicle. In some embodiments, the processor 300 may also obtain environment information around the vehicle or the destination. In some embodiments, the environment information may include road edge, lane, available lane, road type, road surface status, traffic condition, weather condition, obstacle information, or the like, or any combination thereof. The obstacle information may include locations of the one or more obstacles, sizes of the one or more obstacles, types of the one or more obstacles, motion status of the one or more obstacles, moving speed of the one or more obstacles, or the like, or any combination thereof.

In 525, the processor 300 (e.g., the sub-target location determination unit 520 in the trajectory generation module 320) may determine one or more sub-target locations related to the destination. In some embodiments, the destination may be a position in a centerline of a road or a lane. In some embodiments, the destination may be an area covering the centerline of a road or a lane. In some embodiments, the processor 300 (e.g., the original trajectory determination unit 530 in the trajectory generation module 320) may determine a corresponding trajectory between a current location of the vehicle and the determined sub-target locations. The one or more sub-target locations may be determined in any suitable manner. For example, the one or more sub-target locations may be determined based on the current speed of the vehicle. As another example, as shown in FIG. 5C, assuming that point A may denote the starting location of the vehicle, point B5 is on the centerline of a lane and denote the destination for the vehicle. The sub-target locations (e.g., B1, B2, B3, B4) may be determined as equal distance to each other between the current location A and the destination B5 along the road centerline. In some embodiments, the sub-target locations may be determined by sample-based methods. In some embodiments, the one or more sub-target locations may be randomly sampled in a target area. The target area may be an area that covers the centerline of a lane, e.g., a rectangular area B shown in FIG. 5C. The number of the sub-target locations may be a default value of the unmanned vehicle assistance system 100. In some embodiments, the number of the sub-target locations may be adjustable under different situations, e.g., the status information of the vehicle, the environment information around the vehicle or the destination.

In 535, the processor 300 (e.g., the original trajectory determination unit 530 in the trajectory generation module 320) may determine one or more original trajectories based on the vehicle status information and the sub-target locations. For example, the processor 300 (e.g., the original trajectory determination unit 530 in the trajectory generation module 320) may determine the trajectories AB1, AB2, AB3, AB4, AB5 that correspond to the sub-target locations (B1, B2, B3, B4) and the destination (B5), respectively, from the current location A to the sub-target locations and the destination. In some embodiments, the processor 300 may generate the one or more original trajectories from the current location of the vehicle to the one or more sub-target locations and the destination based on a polynomial curve generation algorithm. For example, the polynomial curve generation algorithm may include a cubic spline curve generation algorithm, quintic polynomial generation algorithm, Euler spiral generation algorithm, Bzier curve generation algorithm, or the like, or any combination thereof.

In some embodiments, the processor 300 (e.g., the original trajectory determination unit 530 in the trajectory generation module 320) may further determine the one or more original trajectories based on a vehicle dynamics model of the vehicle. In some embodiments, the vehicle dynamics model may be determined based on the vehicle status information.

Figure 5D:
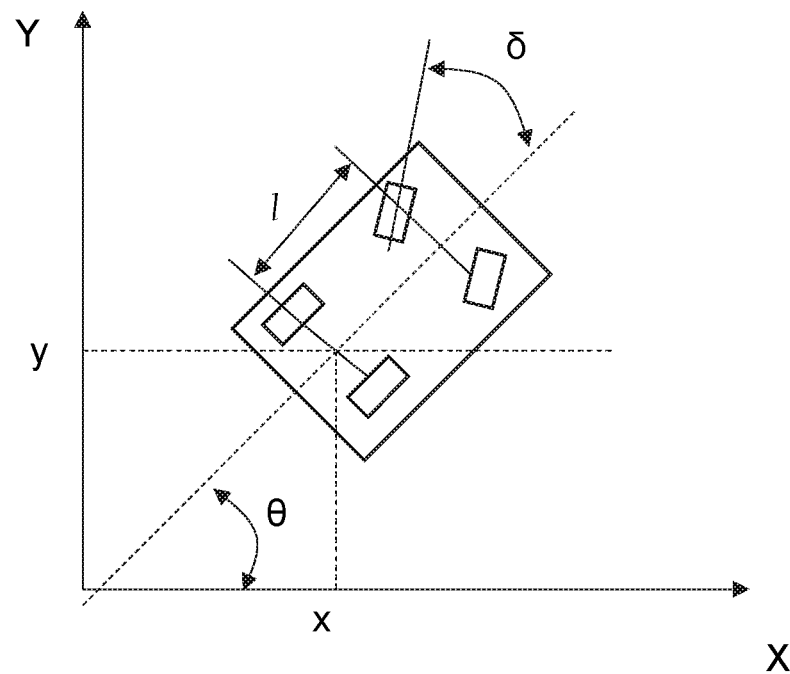
FIG. 5D is a schematic diagram illustrating an exemplary vehicle dynamics model according to some embodiments of the present disclosure.

In some embodiments, as shown in FIG. 5D, the vehicle dynamics model may be shown as Equation (1):

$$\begin{cases} \dot{x} = v\cos\theta \\ \dot{y} = v\sin\theta \\ \dot{\theta} = \frac{v}{l}\tan\delta \end{cases} \quad \text{Equation (1)}$$

wherein (x, y) may denote a coordinate of a center point of a rear axle of the vehicle in a vehicle trajectory coordinate system, v may denote a current velocity of the vehicle, θ may denote a direction angle of the vehicle in the vehicle trajectory coordinate system, δ may denote a steering angle of a front wheel in the vehicle trajectory coordinate system, l may denote a wheel base length, $\dot{x}$ may denote a first derivative of x, $\dot{y}$ may denote a first derivative of y, and $\dot{\theta}$ may denote a first derivative of θ. In some embodiments, the vehicle trajectory coordinate may be a local coordinate system (e.g., a Frenet coordinate system), or a global coordinate system (e.g., a Cartesian coordinate system). The local coordinate system may include a coordinate system corresponding to each position of a trajectory, wherein the first axis in the local coordinate system may be tangent to the trajectory at the position, and the second axis in the local system may be orthogonal to the first axis. The global coordinate system may be a coordinate system corresponding to all the positions of a trajectory. In some embodiments, if the coordinate of the center point is represented by a coordinate in the local coordinate system, the processor 300 (e.g., the original trajectory determination unit 530 in the trajectory generation module 320) may transform the coordinate in the local coordinate system to a coordinate in the global coordinate system.

Figure 6A:
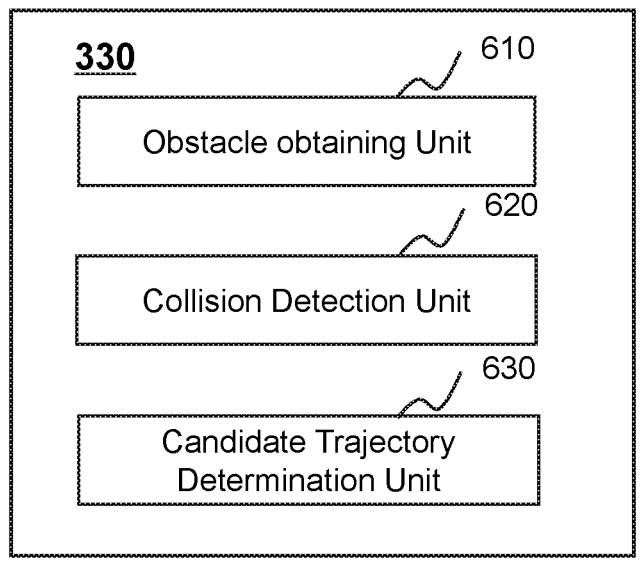
FIG. 6A is a block diagram illustrating an exemplary candidate trajectory determination module according to some embodiments of the present disclosure.

FIG. 6A is a block diagram illustrating an exemplary candidate trajectory determination module 330 according to some embodiments of the present disclosure. In some embodiments, the candidate trajectory determination module 330 may include an obstacle obtaining unit 610, a collision detection module 620, and a candidate trajectory determination unit 630.

The obstacle obtaining unit 610 may be configured to obtain information associated with one or more obstacles. In some embodiments, the obstacle obtaining unit 610 may obtain information associated with the one or more obstacles (e.g., static obstacles, dynamic obstacles) from one or more sensors. In some embodiments, the one or more obstacles may be within a predetermined area around the vehicle. The static obstacles may include a building, tree, roadblock, or the like, or any combination thereof. The dynamic obstacles may include vehicles, pedestrians, and/or animals, or the like, or any combination thereof. In some embodiments, the one or more sensors may be configured to obtain a plurality of images and/or data of the environment information around the vehicle, and include one or more video cameras, laser-sensing devices, infrared-sensing devices, acoustic-sensing devices, thermal-sensing devices, or the like, or any combination thereof.

The collision detection unit 620 may be configured to perform a collision detection between the one or more original trajectories and the one or more obstacles. The collision detection unit 620 may send results of collision detection to the candidate trajectory unit 630 for determining one or more candidate trajectories. In some embodiments, for a static obstacle, the collision detection unit 620 may determine whether the static obstacle is on a trajectory of the one or more trajectories or a distance between the static obstacle and the trajectory is shorter than a predetermined threshold to generate a result of collision detection. In some embodiments, for a dynamic obstacle, the collision detection unit 620 may predict a trajectory of a dynamic obstacle based on the information of the dynamic obstacle. The collision detection unit 620 may perform the collision detection by detecting whether the vehicle moving along the one or more original trajectories may collide with one or more obstacles moving along the predicted trajectory. In some embodiments, the collision detection unit 620 may determine whether the vehicle may collide with the one or more obstacles based on a grid map. For example, the collision detection unit 620 may determine whether there are one or more obstacles that may block the one or more original trajectories in the grid map based on a mathematic morphology algorithm. In some embodiments, the collision detection unit 620 may determine whether the one or more obstacles may block the one or more original trajectories in the grid map based on a conflicting value (CV) associated with each of the plurality of grids.

The candidate trajectory unit 630 may be configured to determine one or more candidate trajectories from the one or more original trajectories. In some embodiments, the candidate trajectory unit 630 may determine the one or more candidate trajectories from the one or more original trajectories based on the results of collision detection. In some embodiments, the candidate trajectory unit 630 may send the one or more candidate trajectories to the target trajectory determination module 340 for generating a target trajectory.

Figure 6B:
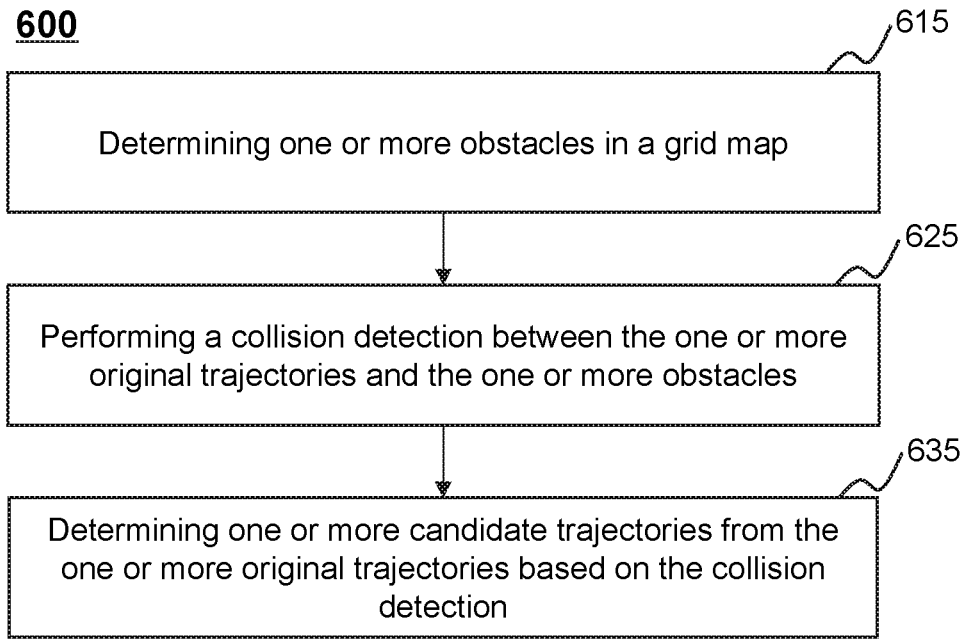
FIG. 6B is a flowchart illustrating an exemplary process and/or method for determining one or more candidate trajectories according to some embodiments of the present disclosure

FIG. 6B is a flowchart illustrating an exemplary process and/or methods for determining one or more candidate trajectories by using a grid map according to some embodiments of the present disclosure. The process and/or method 600 may be executed by a processor in the unmanned vehicle assistance system 100 (e.g., the server 110). For example, the process and/or method 600 may be implemented as a set of instructions (e.g., an application) stored in a non-transitory computer readable storage medium (e.g., storage 120). The processor may execute the set of instructions and may accordingly be directed to perform the process and/or method 600 via receiving and/or sending electronic signals.

In 615, the processor 300 (e.g., the obstacle obtaining unit 610 in the candidate trajectory determination module 330) may determine one or more obstacles. In some embodiments, the candidate trajectory determination module 330 may obtain information associated with the one or more obstacles from one or more sensors. In some embodiments, the obstacles may be within a predetermined area around the vehicle. The information associated with the obstacles may include locations of one or more obstacles, sizes of the one or more obstacles, types of the one or more obstacles, motion status of the one or more obstacles, moving speeds of the one or more obstacles, or the like, or any combination thereof.

In 625, the processor 300 (e.g., the collision detection unit 620 in the candidate trajectory determination module 330) may perform a collision detection between the one or more original trajectories and the one or more obstacles. In some embodiments, the processor 300 (e.g., the collision detection unit 620 in the candidate trajectory determination module 330) may perform the collision detection by detecting whether the vehicle may collide with one or more obstacles when the vehicle moves along the one or more original trajectories. In some embodiments, the processor 300 (e.g., the collision detection unit 620 in the candidate trajectory determination module 330) may determine whether the vehicle may collide with the one or more obstacles based on a grid map. Detailed description of performing the collision detection by using the grid map may be found elsewhere in the present disclosure. See, e.g., FIG. 6C and the description thereof.

In 635, the processor 300 (e.g., the candidate trajectory determination unit 630 in the candidate trajectory determination module 330) may determine one or more candidate trajectories from the one or more original trajectories based on the collision detection. For example, assuming that one or more obstacles exist around or along the path that the vehicle drives through, the processor 300 may determine whether the vehicle may collide with any of the one or more obstacles when moving along a first trajectory. If the processor 300 determines that the vehicle, while moving along the first trajectory, may not collide with the any of the one or more obstacles, the processor 300 may determine the first trajectory as a candidate trajectory. If the processor determines that the vehicle, while moving along the first trajectory, may collide with any of the one or more obstacles, the processor may not determine the first trajectory as a candidate trajectory. Furthermore, for a static obstacle, the collision detection unit 620 may determine whether the static obstacle is on a trajectory of the one or more trajectories or a distance between the static obstacle and the trajectory is shorter than a predetermined distance. If the static obstacle is on the trajectory of the one or more trajectories or the distance between the static obstacle and the trajectory is shorter than a predetermined distance, the candidate trajectory determination unit 630 may not determine the trajectory as a candidate trajectory. If the static obstacle is far from the trajectory of the one or more trajectories (e.g., a distance between the static obstacle and the trajectory is greater than or equal to a predetermined distance), the candidate trajectory determination unit 630 may not determine the trajectory as a candidate trajectory. For a dynamic obstacle, the collision detection unit 620 may predict a trajectory of a dynamic obstacle based on the information of the dynamic obstacle. The collision detection unit 620 may perform the collision detection by detecting whether the vehicle moving along the one or more original trajectories may collide with one or more obstacles moving along the predicted trajectory.

Figure 6C:
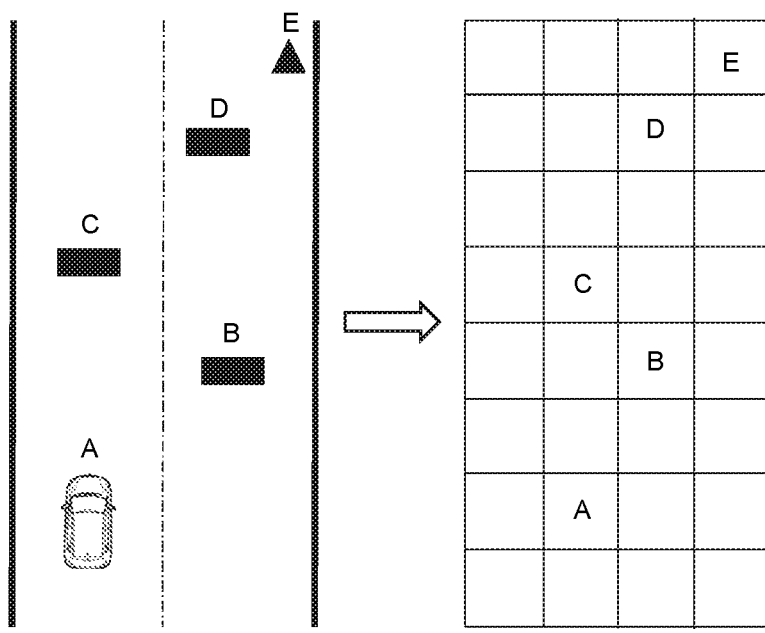
FIG. 6C is a schematic diagram illustrating exemplary collision detection according to some embodiments of the present disclosure.

FIG. 6C is a schematic diagram illustrating exemplary collision detection according to some embodiments of the present disclosure. In some embodiments, the processor 300 (e.g., the candidate trajectory determination module 330) may perform a grid processing for a road scenario. For example, the processor 300 may transform the road scenario to a grid map. The grid map include a plurality of grids. Each grid may represent an area of a road. In some embodiments, the size of each of the plurality of grids in the grid map may be any suitable value, e.g., 10 cm×10 cm, 20 cm×20 cm, 30 cm×30 cm. In some embodiments, the candidate trajectory determination module 330 may project the obstacles and the vehicle into the grid map. As shown in FIG. 6C, A may represent an unmanned vehicle, B, C, and D may represent a plurality of obstacles in the front of the unmanned vehicle, E may represent a destination and/or a target area of the unmanned vehicle. The processor may project the road scenario into the corresponding grid map. It should be understood for persons having ordinary skills in the art that the grid map may divide the plurality of grids into obstacle grids and free grids. The obstacle grid may refer to a grid occupied by one or more obstacles. The free gird may refer to a grid not occupied by any obstacle. In some embodiments, the processor may define a binary number as a value associated with each of the plurality of grids. For example, the obstacle grid may be designated as 1, the free grid may be designated as 0. If a trajectory passes through an obstacle grid, the candidate trajectory determination unit 630 may not determine the trajectory as a candidate trajectory. If a trajectory does not pass through any of the obstacle grids, the candidate trajectory determination unit 630 may determine the trajectory as a candidate trajectory.

In some embodiments, the processor 300 may determine whether the one or more obstacles may be near/on the one or more original trajectories in the grid map based on a conflicting value (CV) relating to each of the plurality of grids. The CV relating to a grid may represent a collision probability between the vehicle and the obstacle. In some embodiments, the processor may determine the CV based on a conflicting circle method. For example, the conflicting circle method may be used to determine a circle according to the speed of the vehicle. The center of the circle may be the centroid of the vehicle. The radius of the circle may be determined based on a function related to one or more factors, e.g., the speed, mass, maximum traction of the vehicle. In some embodiments, the processor 300 may determine the CV based on a distance between the obstacle (e.g., a center of the grid that includes the obstacle) and the center of the circle. In some embodiments, the processor 300 may determine the CV relating to each grid based on an area of a common region between the grid and the circle. In some embodiments, the collision detection unit 620 may perform the collision detection based on a threshold. For example, if a CV relating to a first grid is greater than a threshold, and the first grid may be on a first trajectory in the grid map, then the collision determination unit 620 may determine that the vehicle may collide with the obstacle in the first grid when the vehicle moves along the first trajectory.

Figure 7A:
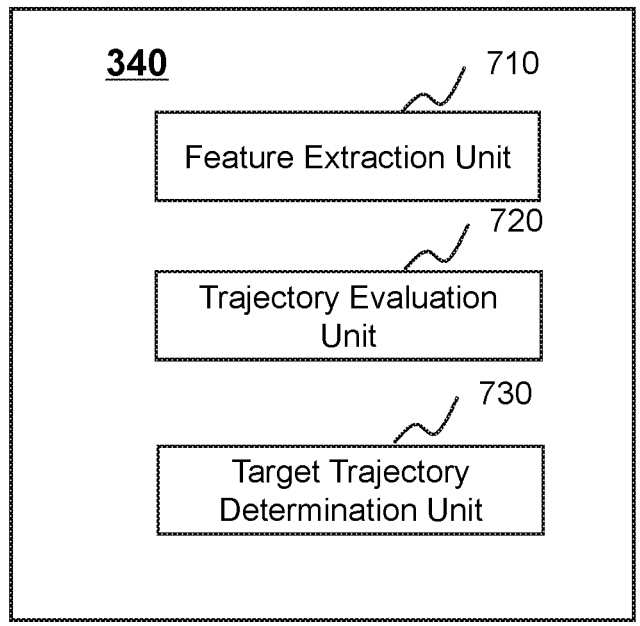
FIG. 7A is a block diagram illustrating an exemplary target trajectory determination module according to some embodiments of the present disclosure.

FIG. 7A is a block diagram illustrating an exemplary target trajectory determination module 340 according to some embodiments of the present disclosure. The target trajectory determination module 340 may include a feature extraction unit 710, a trajectory evaluation unit 720, and a target trajectory determination unit 730.

The feature extraction unit 710 may be configured to extract one or more features with respect to one or more candidate trajectories. The one or more candidate trajectories may be from a storage device (e.g., the storage 120), or the candidate trajectory determination module 340. In some embodiments, the one or more features with respect to a trajectory may include a speed (e.g., an instantaneous speed, an average speed) of the vehicle, an accelerated speed (e.g., an instantaneous accelerated speed, an average accelerated speed) of the vehicle, a trajectory similarity, and/or a curvature (e.g., instantaneous curvature) of the trajectory. In some embodiments, the one or more features may be in the form of a vector. The one or more features may be used as inputs to a trajectory evaluation model configured to evaluate a trajectory and determine a target trajectory from the one or more candidate trajectories.

The trajectory evaluation unit 720 may be configured to evaluate the one or more candidate trajectories. Furthermore, the trajectory evaluation unit 720 may be configured to evaluate the one or more candidate trajectories based on the one or more features and a trajectory evaluation model. The evaluation result with respect to the one or more candidate trajectories may be stored in a storage device (e.g., the storage 120). In some embodiments, the trajectory evaluation model may be determined based on a machine learning technique. The machine learning technique may include an artificial neural network, support vector machine (SVM), decision tree, random forest, or the like, or any combination thereof. In some embodiments, the trajectory evaluation model may include a weighting function. The trajectory evaluation unit 720 may evaluate the one or more candidate trajectories based on the weighting function. The evaluation result determination unit 720 may send the evaluation results to the processor 300 (e.g., the target trajectory determination unit 730) for determining a target trajectory from the one or more candidate trajectories.

The target trajectory determination unit 730 may be configured to determine a target trajectory based on the evaluation results relating to the one or more candidate trajectories.

Figure 7B:
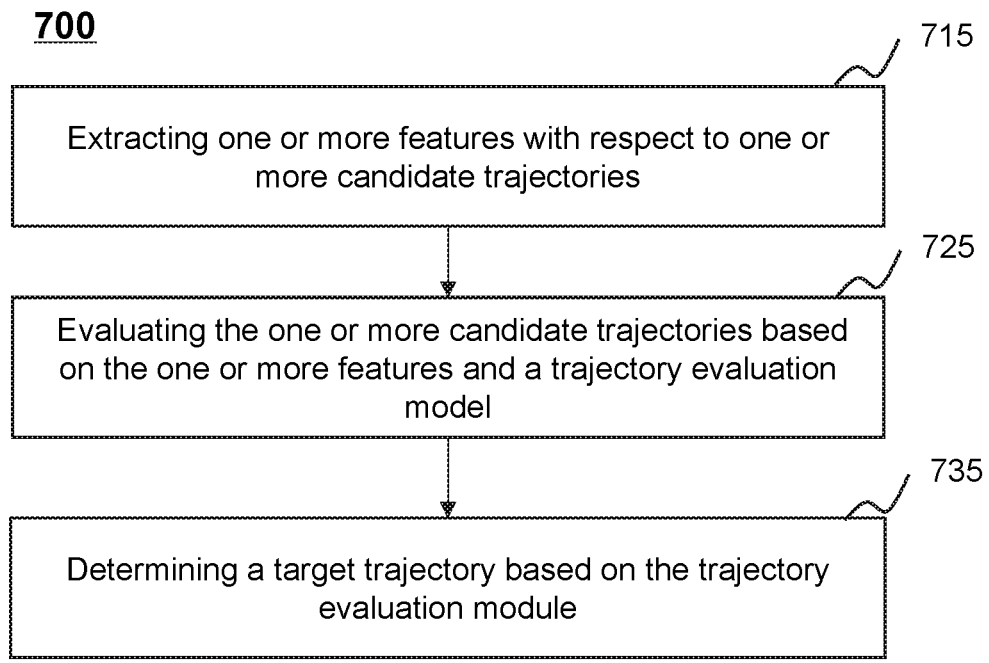
FIG. 7B is a flowchart illustrating an exemplary process and/or method for determining a target trajectory according to some embodiments of the present disclosure.

FIG. 7B is a flowchart illustrating an exemplary process and/or method for determining a target trajectory according to some embodiments of the present disclosure. The process and/or method 700 may be executed by a processor in an unmanned vehicle assistance system 100 (e.g., the server 110). For example, the process and/or method 700 may be implemented as a set of instructions (e.g., an application) stored in a non-transitory computer readable storage medium (e.g., the storage 120). The processor may execute the set of instructions and may accordingly be directed to perform the process and/or method 700 via receiving and/or sending electronic signals.

In 715, the processor 300 (e.g., the feature extraction unit 710 in the target trajectory determination module 340) may extract one or more features with respect to one or more candidate trajectories. In some embodiments, the one or more features may include a speed (e.g., an instantaneous speed, an average speed) of the vehicle, an accelerated speed (e.g., an instantaneous accelerated speed, an average accelerated speed) of the vehicle, a trajectory similarity, and/or a curvature (e.g., instantaneous curvature) of a trajectory, etc. The trajectory similarity may be determined based on a contract ratio of the candidate trajectory at the current moment and the trajectory at the previous moment. For example, at the previous moment T, the trajectory of the vehicle is R1. The trajectory at the previous moment R1 may include a plurality of positions (also referred to herein as a plurality of first positions). At the current moment T+1, a candidate trajectory is R2. The candidate trajectory at the current moment, R2 may include a plurality of positions (also referred to herein as a plurality of second positions). The processor 300 may determine the contract ratio based on the plurality of first positions and the plurality of second positions. In some embodiments, the instantaneous curvature of the candidate trajectory may be expressed as a function of a front wheel steering angle of the vehicle and a wheel base length of the vehicle. In some embodiments, the one or more features may be in the form of a vector. The one or more features may be used as inputs to a trajectory evaluation model configured to determine a target trajectory from the one or more candidate trajectories.

In 725, the processor 300 (e.g., the evaluation result determination unit 720 in the target trajectory determination module 340) may evaluate the one or more candidate trajectories based on the one or more features and the trajectory evaluation model. In some embodiments, the trajectory evaluation unit 720 may determine an evaluation result for each of the one or more candidate trajectories. The evaluation result may reflect a likelihood that a trajectory is determined as a target trajectory. The evaluation result may be presented as a numerical format (e.g., from 0 to 100, from 0 to 10, etc.), a character format (e.g., A, B, C, D . . . ), etc. If the evaluation result is presented in a numerical format from 0 to 100, a trajectory corresponding to a larger evaluation result may be more likely to be determined as the target trajectory in comparison with a trajectory corresponding to a smaller evaluation result. If the evaluation result is presented as A, B, C, D, . . . , a trajectory corresponding to an evaluation result A may be more likely to be determined as the target trajectory in comparison with a trajectory corresponding to an evaluation result B.

In some embodiments, the trajectory evaluation model may include a weighting function. In some embodiments, the weighting function may be determined based on Equation (2):

$$F=\Sigma_{i=1}^{n} f_i \times w_i \qquad \text{Equation (2)}$$

wherein F may denote a value of the weighting function corresponding to a candidate trajectory, $f_i$ may denote the features of a candidate trajectory, and $w_i$ may denote a weight assigned to a feature. The target trajectory may be determined based on values of the weighting function of the plurality of candidate trajectories. In some embodiments, the values corresponding to each of the candidate trajectories may be transformed to corresponding evaluation results. The target trajectory determination unit 730 may determine a target trajectory based on the evaluation results. In some embodiments, the trajectory evaluation model may be determined based on a machine learning technique. The machine learning technique may include an artificial neural network, support vector machine (SVM), decision tree, random forest, or the like, or any combination thereof. In some embodiments, the trajectory evaluation model may be trained in advance. Alternatively or additionally, the trajectory evaluation model may be trained and/or updated in real time. In some embodiments, the trajectory evaluation model may be determined by performing one or more operations described in connection with FIG. 8B.

In 735, the processor 300 (e.g., the target trajectory determination unit 730 in the target trajectory determination module 340) may determine a target trajectory based on the trajectory results determined in 725. In some embodiments, the target trajectory determination module 340 may determine a candidate trajectory corresponding to the smallest value of the weighting function as the target trajectory. For example, S1 is the value of the weighting function corresponding to a first candidate trajectory, S2 is the value of the weighting function corresponding to a second candidate trajectory, S3 is the value of the weighting function corresponding to a third candidate trajectory, and S1 is the smallest value among S1, S2, and S3, then the target trajectory determination unit 730 may determine the first candidate trajectory as the target trajectory.

Figure 8A:
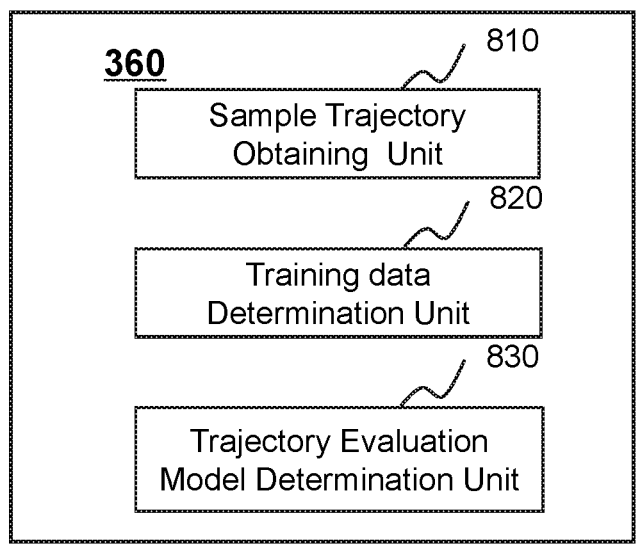
FIG. 8A is a block diagram illustrating an exemplary model determination module according to some embodiments of the present disclosure.

FIG. 8A is a block diagram illustrating an exemplary model determination module 360 according to some embodiments of the present disclosure. The model determination module 360 may include a sample trajectory obtaining unit 810, a training data determination unit 820, and a trajectory evaluation model determination unit 830.

The sample trajectory obtaining unit 810 may be configured to obtain a plurality of sample trajectories. The sample trajectory obtaining unit 810 may obtain the plurality of sample trajectories from a storage device (e.g., the storage 120). The number of the plurality of sample trajectories may be a default value of the unmanned vehicle assistance system 100, or may be adjustable under different situations. In some embodiments, the plurality of sample trajectories may include historical trajectories within a predetermined time period. In some embodiments, the plurality of sample trajectory may include historical trajectories associated with an area (e.g., a state, a province, a city, a district, etc.).

The training data determination unit 820 may be configured to determine training data based on the plurality of sample trajectories. In some embodiments, the training data determination unit 820 may extract one or more sample features with respect to the plurality of sample trajectories. The one or more sample features may include a sample starting location, a sample destination, a sample speed of a vehicle associated with the trajectory, a sample accelerated speed of the vehicle, a trajectory similarity, a sample curvature of the trajectory, or the like, or any combination thereof. In some embodiments, the training data determination unit 820 may also may obtain a plurality of corresponding sample evaluation results from the storage 120. The training data determination unit 820 may determine the plurality of sample features and the plurality of corresponding sample evaluation results as the training data.

The trajectory evaluation model determination unit 830 may be configured to generate a trajectory evaluation model based on the training data. In some embodiments, the trajectory evaluation model determination unit 830 may determine the trajectory evaluation model based on a machine learning technique. The machine learning technique may include an artificial neural network, support vector machine (SVM), decision tree, random forest, or the like, or any combination thereof.

Figure 8B:
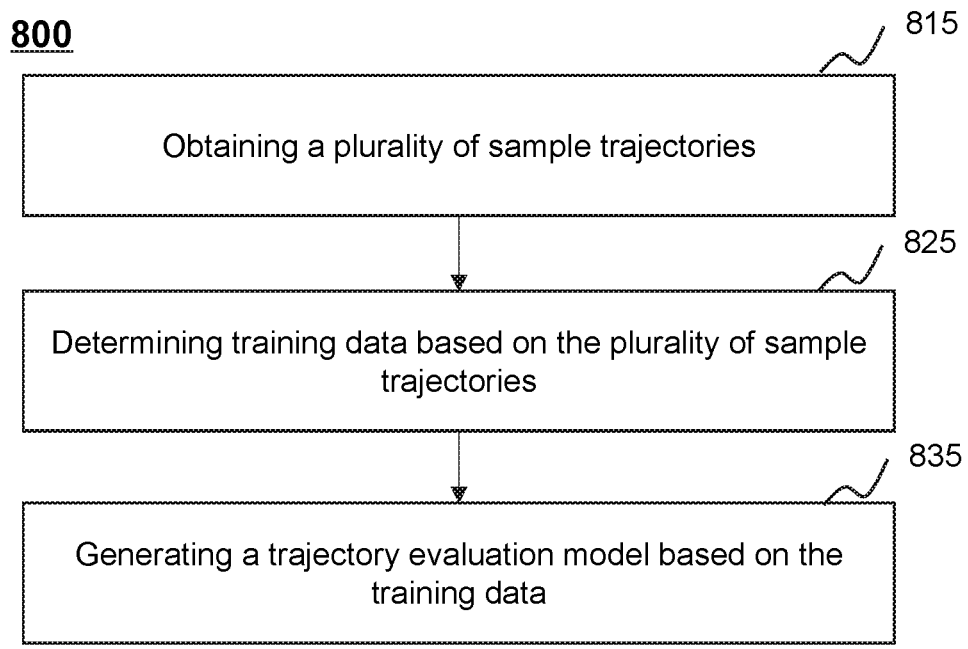
FIG. 8B is a flowchart illustrating an exemplary process and/or method for determining a trajectory evaluation model according to some embodiments of the present disclosure.

FIG. 8B is a flowchart illustrating an exemplary process and/or method for determining a trajectory evaluation model according to some embodiments of the present disclosure. The process and/or method 800 may be executed by a processor in an unmanned vehicle assistance system 100 (e.g., the server 110). For example, the process and/or method 800 may be implemented as a set of instructions (e.g., an application) stored in a non-transitory computer readable storage medium (e.g., the storage 120). The processor may execute the set of instructions and may accordingly be directed to perform the process and/or method 800 via receiving and/or sending electronic signals.

In 815, the processor 300 (e.g., the sample trajectory obtaining unit 810 in the model determination module 360) may obtain a plurality of sample trajectories. The processor 300 may obtain the plurality of sample trajectories from a storage medium (e.g., the storage 120,). The number of the plurality of sample trajectories may be a default value of the unmanned vehicle assistance system 100, or may be adjustable under different situations. The plurality of sample trajectories may include historical trajectories within a predetermined time period. In some embodiments, the plurality of sample trajectory may include historical trajectories associated with an area (e.g., a state, a province, a city, a district, etc.).

In 825, the processor 300 (e.g., the training data determination unit 820 in the model determination module 360) may determine training data based on the plurality of sample trajectories. In some embodiments, the processor 300 (e.g., the training data determination unit 820 in the model determination module 360) may extract one or more sample features with respect to each of the plurality of sample trajectories. The one or more sample features of a sample trajectory may include a sample starting location, a sample destination, a sample speed (e.g., an instantaneous speed, an average accelerated speed) of a vehicle associated with the sample trajectory, a sample accelerated speed (e.g., an instantaneous accelerated speed, an average accelerated speed) of the vehicle, a trajectory similarity, a sample curvature (e.g., an instantaneous curvature, an average curvature) of the sample trajectory, or the like, or any combination thereof. In some embodiments, the processor 300 (e.g., the training data determination unit 820 in the model determination module 360) may obtain a plurality of corresponding sample evaluation results associated with the plurality of sample trajectories. In some embodiments, the processor 300 (e.g., the training data determination unit 820 in the model determination module 360) may obtain the plurality of corresponding sample evaluation results from the storage 120. In some embodiments, the processor 300 (e.g., the training data determination unit 820 in the model determination module 360) may determine the one or more sample features and the corresponding sample evaluation results as the training data.

In 835, the processor 300 (e.g., the trajectory evaluation determination unit 820 in the model determination module 360) may generate the trajectory evaluation model based on the training data. It should be noted that, when training the trajectory evaluation based on the training data, the process and/or method 800 may include one or more iterations. In each of the one or more iterations, the processor may generate a trajectory evaluation model. In some embodiments, the processor may finish the iterations until a loss function of the generated trajectory evaluation model may converge to a threshold. In some embodiments, the threshold may be a predetermined value stored in a storage medium (e.g., the storage 120), and/or a dynamic threshold.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the preceding.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

I claim:

1. A system for determining a trajectory for a vehicle, comprising:
at least one storage medium including a set of instructions; and
at least one processor configured to communicate with the at least one storage medium, wherein when executing the set of instructions, the at least one processor is directed to:
obtain status information of a vehicle;
obtain a current location of the vehicle and a destination;
determine one or more sub-target locations related to the destination, wherein a count of the one or more sub-target locations are determined based on the status information of the vehicle;
determine one or more original trajectories from the current location of the vehicle to the destination based on the status information of the vehicle and the one or more sub-target locations;
determine one or more candidate trajectories from the one or more original trajectories based on results of a collision detection test, wherein each of the one or more candidate trajectories has no obstacle, as determined by the at least one processor;
obtain an trajectory evaluation model;
extract feature vectors from the one or more candidate trajectories, each feature vector corresponding to a candidate trajectory and including a speed of the vehicle and a similarity for the candidate trajectory between a current moment T+1 and a previous moment T; and
determine a target trajectory from the one or more candidate trajectories based on the trajectory evaluation model and the feature vectors for the one or more candidate trajectories.

2. The system of claim 1, wherein the status information of the vehicle includes at least one of:
a driving direction of the vehicle,
the speed of the vehicle,
an accelerated speed of the vehicle,
a wheel base of the vehicle, or
a front wheel steering angle of the vehicle.

3. The system of claim 1, wherein to determine the one or more sub-target locations related to the destination, the at least one processor is further directed to:
determine the one or more sub-target locations related to the destination based on a current speed of the vehicle.

4. The system of claim 1, wherein to determine the one or more candidate trajectories from the one or more original trajectories, the at least one processor is further directed to:
determine one or more obstacles in a grid map;
perform a collision detection between the one or more original trajectories and the one or more obstacles; and
determine the one or more candidate trajectories from the one or more original trajectories based on the collision detection.

5. The system of claim 1, wherein the trajectory model is a machine learning model and the machine learning model is trained and updated in real time.

6. The system of claim 1; wherein the at least one processor is further directed to:
obtain a plurality of sample trajectories;
determine training data based on the plurality of sample trajectories; and
determine the trajectory evaluation model based on the training data.

7. The system of claim 6; wherein to determine the training data based on the plurality of sample trajectories, the at least one processor is further directed to:
extract one or more sample features with respect to the plurality of sample trajectories and a sample evaluation result associated with each of the plurality of sample trajectories; and
determine the one or more sample features and the corresponding sample evaluation results as the training data.

8. The system of claim 7, wherein the one or more sample features include at least one of:
a sample starting location,
a sample destination,
a sample speed of a vehicle,
a sample accelerated speed of a vehicle, or
a sample curvature.

9. The system of claim 1, wherein the at least one processor is further directed to;
determine a speed planning strategy based on the target trajectory.

10. The system of claim 1, wherein to determine the one or more sub-target locations related to the destination, the at least one processor is further directed to:
determine the one or more sub-target locations related to the destination by randomly sampling in a target area, wherein the target area covers a centerline of a lane.

11. A method implemented on a computer device having a processor, a storage medium, and a communication platform connected to a network, the method comprising:
obtaining, by the processor, status information of a vehicle;
obtaining, by the processor, a current location of the vehicle and a destination;
determining, by the processor, one or more sub-target locations related to the destination, wherein a count of the one or more sub-target locations are determined based on the status information of the vehicle;
determining, by the processor, one or more original trajectories from the current location of the vehicle to the destination based on the status information of the vehicle and the one or more sub-target locations;
determining, by the processor, one or more candidate trajectories from the one or more original trajectories based on result of a collision detection test, wherein each of the one or more candidate trajectories has no obstacle, as determined by the at least one processor;
obtaining, by the processor, an trajectory evaluation model;
extracting, by the processor, feature vectors from the one or more candidate trajectories, each feature vector corresponding to a candidate trajectory and including a speed of the vehicle and a similarity for the candidate trajectory between a current moment T+1 and a previous moment T; and
determining, by the processor, a target trajectory from the one or more candidate trajectories based on the trajectory evaluation model and the feature vectors for the one or a ore available trajectories.

12. The method of claim 11, wherein the status information of the vehicle includes at least one of:
a driving direction of the vehicle,
the speed of the vehicle,
an accelerated speed of the vehicle,
a wheel base of the vehicle, or
a front wheel steering angle of the vehicle.

13. The method of claim 11, wherein the determining the one or more sub-target locations related to the destination comprises:
determining the one or more sub-target locations related to the destination based on a current speed of the vehicle.

14. The method of claim 11, wherein the determining the one or more candidate trajectories comprises:
determining one or more obstacles in a grid map;
performing a collision detection between the one or more original trajectories and the one or more obstacles; and
determining the one or more candidate trajectories from the one or more original trajectories based on the collision detection.

15. The method of claim 1, wherein the determining the one or more sub-target locations related to the destination comprises:
determining the one or more sub-target locations related to the destination by randomly sampling in a target area, wherein the target area covers a centerline of a lane.

16. The method of claim 11, further comprising:
obtaining a plurality of sample trajectories;
determining training data based on the plurality of sample trajectories; and
determining the trajectory evaluation model based on the training data.

17. The method of claim 16, wherein the determining training data based on the plurality of sample trajectories comprises:
extracting one or more sample features with respect to the plurality of sample trajectories and a sample evaluation result associated with each of the plurality of sample trajectories; and
determining the one or more sample features and the corresponding sample evaluation results as the training data.

18. The method of claim 11, wherein the one or more sample features include at least one of:
a sample starting location,
a sample destination,
a sample speed of a vehicle,
a sample accelerated speed of a vehicle, or
a sample curvature of a sample trajectory.

19. The method of claim 11, further comprising:
determining a speed planning strategy based on the target trajectory.

20. A non-transitory computer readable medium, comprising at least one set of instructions for determining a trajectory for a vehicle, wherein when executed by at least one processor of an electronic terminal, the at least one set of instructions directs the at least one processor to perform acts of:
obtaining status information of a vehicle;
obtaining a current location of the vehicle and a destination;
determining one or more sub-target locations related to the destination, wherein a count of the one or more sub-target locations are determined based on the status information of the vehicle;
determining one or more original trajectories from the current location of the vehicle to the destination based on the status information of the vehicle and the one or more sub-target locations;
determining one or more candidate trajectories from the one or more original trajectories, bases on a collision detection test, wherein each of the one or more candidate trajectories has no obstacle, as determined by the at least one processor;
extract feature vectors form the one or more candidate trajectories; each feature vector corresponding to a candidate trajectory and including a speed of the vehicle and a similarity for the candidate trajectory between a current moment T+1 and a pervious moment T; and
determining a target trajectory from the one or more candidate trajectories based on a trajectory evaluation model and the feature vectors for the one or more candidate trajectories.

* * * * *